United States Patent
Brooks et al.

[11] 3,707,844
[45] Jan. 2, 1973

[54] HYDRAULIC ACTUATOR

[75] Inventors: Robert E. Brooks, Worthington; Robert T. Marks, Columbus, both of Ohio

[73] Assignee: Ranco Incorporated, Columbus, Ohio

[22] Filed: Aug. 3, 1971

[21] Appl. No.: 168,596

[52] U.S. Cl. ..............................60/52 B, 60/52 US
[51] Int. Cl. ...............................................F15b 15/18
[58] Field of Search ............60/52 US, 52 CD, 52 B; 137/468, 565

[56] References Cited

UNITED STATES PATENTS

| | | | |
|---|---|---|---|
| 1,774,836 | 9/1930 | Lormüller | 60/52 B UX |
| 2,330,739 | 9/1943 | Piron | 60/52 B X |
| 2,620,628 | 12/1952 | Ray | 60/52 CD |
| 2,980,064 | 4/1961 | Norton et al. | 60/52 B UX |

Primary Examiner—Edgar W. Geoghegan
Attorney—Watts, Hoffman, Fisher & Heinke

[57] ABSTRACT

A hermetically sealed hydraulic actuator comprises a spring loaded piston and cylinder, the position of the piston in the cylinder being controlled by the output of a constantly running fluid pump which withdraws oil from a sump in communication with the cylinder and discharges into the cylinder. The pump discharge may be more or less diverted from the cylinder to the sump by a diverter valve regulated by the movement of an electrically heated thermal element in the sump. The thermal element temperature is controlled by a suitable power supply circuit, which may respond to differences in a condition to be regulated by the actuator, and the effect of the element on the diverter valve for a given circuit response is adjustable by shifting the port of the diverter valve relative to the element. A screw accessible from the exterior of the sump shifts the diverter valve port.

3 Claims, 4 Drawing Figures

INVENTORS
ROBERT E. BROOKS
ROBERT T. MARKS
BY
Watts, Hoffmann, Fisher & Heinke
ATTORNEYS INVENTORS
ROBERT E. BROOKS
ROBERT T. MARKS
BY
*Watts, Hoffmann, Fisher & Heinke*
ATTORNEYS

HYDRAULIC ACTUATOR

THE FIELD OF THE INVENTION

The present invention relates to hydraulic actuators comprising a cylinder and piston, and means to direct fluid into the cylinder and cause the piston to move to a given position in the cylinder in response to an external condition Actuators of the type involved are useful in positioning dampers and valves in temperature control systems and the like.

BACKGROUND OF THE INVENTION

It is common practice to provide actuators for dampers, valves and the like which comprises a cylinder having a piston slidable therein in accordance with the volume of fluid introduced into the cylinder. The volume of fluid in the cylinder is controlled by a continuously operating pump which discharges fluid into the cylinder and fluid escapes from the cylinder through a bleed port and returns to the pump inlet. The bleed port is controlled by a valve in response to a power means which assumes a valve controlling position in accordance with an external condition. In some instances the bleed valve operation is also influenced according to the position of the piston in the cylinder. The piston is attached to mechanism for positioning the dampers to be controlled and a spring biases the piston to one end of the cylinder. An example of the type of actuator referred to is shown in U.S. Pat. No. 1,772,403.

It is desirable in the manufacture of devices of the type mentioned that the actuator can be readily calibrated so that the piston will assume a given position in the cylinder at a given condition to which the actuator is to respond.

THE PRESENT INVENTION

The present invention provides a hermetically sealed fluid system for actuators similar to the type described and of such construction that the position of the piston is controlled by a fluid valve operated by a movable control element which responds to a change in a condition, the spacing between a valve member of the fluid control valve and the condition responsive control element can be accurately effected by an adjustment made externally of the fluid system of the actuator.

More specifically, the object of the invention is the provision of an actuator comprising a cylinder and piston and means forming a hermetically closed fluid circulating system for the cylinder which includes a sump and a pump, the inlet of the pump being open to the sump and the discharge of the pump having branch paths, one entering the cylinder and the other discharging into the sump, a diverter valve controlling the discharge branch of the pump leading to the sump, which valve is controlled by a movable power element adapted to shift towards and from a member of the diverter valve. Preferably, the port of the diverter valve is supported on a rotatable member which is threaded in a wall of the actuator and which has an annular groove forming a fluid passage connection between the pump discharge branch and the diverter valve seat.

Other objects and advantages of the invention will be apparent from the following description of a preferred form of the invention, reference being made to the accompanying drawings wherein.

Figure 1:
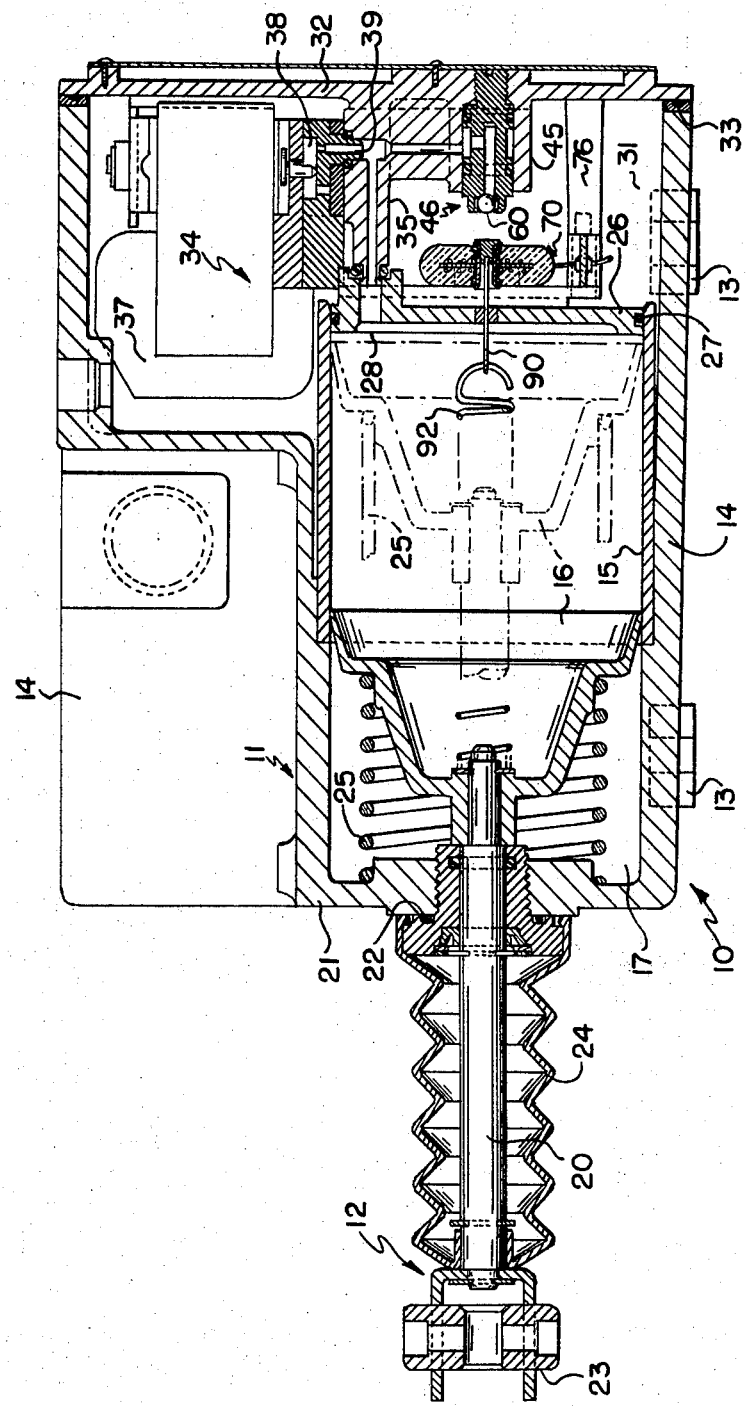
FIG. 1 is a sectional view of an actuator embodying the invention.

Referring to FIG. 1 of the drawings, an actuator 10 is shown which may be utilized to control the position of dampers, valves, etc., of a heating and cooling system for a building. The actuator includes a casing 11 and a movable actuator member 12. The casing 11 has four legs 13, only two of which are shown, adapted to be attached to a suitable base, not shown, and the actuator is adapted to be attached to mechanism for operating air dampers or the like, likewise not shown. A pair of opposed walls 14 of the casing 11 form sides of a circuit panel housing which may be closed by a suitable cover. Only one wall 14 is shown and the cover is omitted.

The casing 11 includes a cylinder 15 having a piston 16 slidable therein. In the form shown, the cylinder 15 comprises a sleeve which is fitted in alignment with a cylindrical section 17 of the casing. The piston 16 is bell-shape and has a piston rod 20 attached thereto which extends through an opening in the end wall 21 of the cylinder. Suitable packing 22 seals the space between the piston rod and the end wall 21. The outer end of the piston rod 20 has a yoke and pin 23 for attaching the rod to damper operating mechanism. Preferably, a flexible bellows type tubular seal 24 surrounds the portion of the rod projecting from the cylinder to prevent collection of dirt, etc., on the piston rod. A compression spring 25 surrounds the rod 20 and extends between the end wall 21 and the skirt of the piston 16. The spring 25 constantly urges the piston to the right-hand end of the cylinder as shown in dotted lines, FIG. 1 and in full in FIG. 2. The piston 16 and the rod 20 form the actuator member 12.

The end of the cylinder opposite the end wall 21 is closed by an end wall 26 and a suitable ring seal 27 prevents leakage of fluid between the cylinder wall and the end wall 26. A fluid inlet 28 into the cylinder 15 is provided by a passage formed through a boss on the wall 26.

The assembly 14 includes a cavity 31 which forms a motor driven pump housing and an oil sump or reservoir. The cavity 31 is closed by an end plate 32 which is suitably secured to the right-hand end walls of the assembly 14 by bolts, not shown. A seal 33 provides a leakproof joint between the end plate 32 and the walls of the assembly 14.

An electric motor-driven pump 34 is attached to a wall 35, formed on the end plate 32, by bolts 36 and is disposed in the cavity 31. The pump 34 comprises an electric motor 37 which drives a gear type oil pump 38. The oil pump 38 may be of any well known construction and includes an inlet, not shown, from the sump and a discharge 39. As may be seen in FIG. 2, the discharge 39 includes a nipple which is sealingly connected with one end of a cross-bore 40 formed in a boss 41 projecting from the end plate 32. The cross-bore 40 is intercepted by a discharge bore 42 which is formed in the wall formation 35 and a neck portion 43 is formed from the wall 35 and is received in the inlet opening 28. A seal is provided between the engaging parts of the neck and the end edges of the inlet 28.

Figure 2:
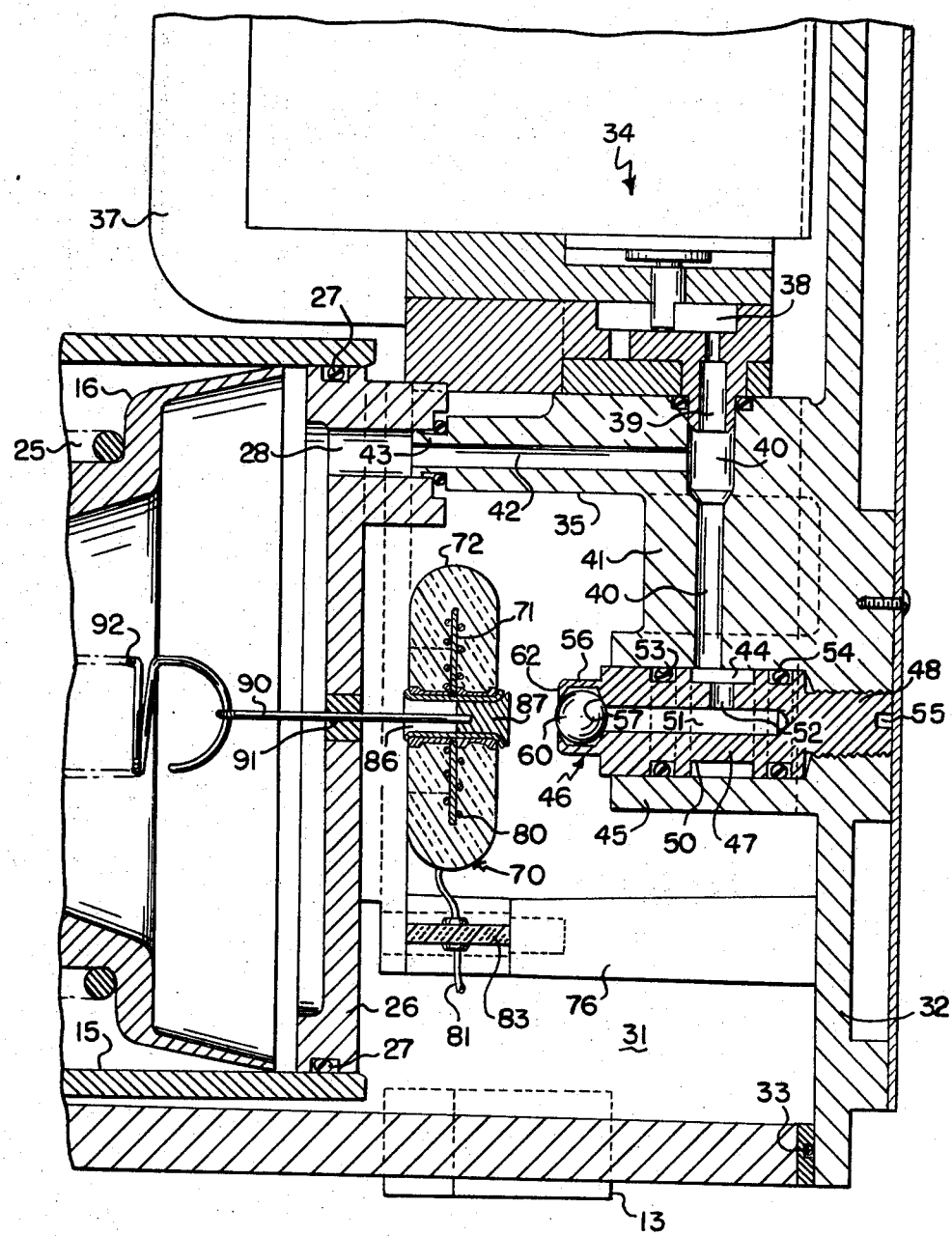
FIG. 2 is a fragmentary view of a portion of the actuator shown in FIG. 1 and on a larger scale.

The lower end of the cross-bore 40, as viewed in FIG. 2, opens into a large bore 44 which is formed in a boss 45 projecting from the end plate 32. A diverting valve assembly 46 is disposed in the bore 45 and controls flow of discharge oil from the bore 40 into the cavity 31.

Referring more particularly to FIG. 2, the valve assembly 46 includes a cylindrical member 47 which is closely received in the bore 45 and has a threaded neck 48 which is threaded in an opening through the end plate 32. An annular groove 50 is formed about the member 47 which is adapted to register with and overlap the opening of bore 40. The member 47 has a axial bore 51 which terminates short of the right-hand end of the member and which bore is in communication with the bottom of groove 50 by a cross-bore 52. It will be seen that the discharge oil from the pump may flow into bore 40, groove 50 and bores 52,51 and into the cavity 31. Ring type oil seals 53 and 54 are positioned in annular recesses in the member 47 at opposite sides of the groove 50 to prevent leakage of oil from the peripheral end sections of the member 47.

The member 47 may be rotated by inserting a screwdriver into a slot 55 formed in the outer end of the neck 48. By rotating the member 47 the member can be shifted axially while maintaining an oil passageway from bore 40 through the groove 50 and bores 52,51.

The left-hand end of the member 47 has a neck or cage 56 formed thereon and the section of the bore 51 through the neck is enlarged. This enlargement forms an annular valve seat or port 57 and a cage for a ball valve member 60. The flow of oil from the bore 51 and through the seat 57 is controlled by the ball 60 which is adapted to be moved and engage the valve seat. The ball 60 is loosely retained in the neck 56 by inturned edges 62 of the neck to trap the ball inside the enlarged passage through the neck. During operation of the pump 34, oil discharged by the pump may flow through either passage 42 into the cylinder 15 or it may be directed back into the cavity 31 through the valve seat 57 when no external force is applied to the ball 60 urging it to the seat 57.

The ball 60 is adapted to be urged against the valve seat 57 and throttle and close the flow through the valve seat by a thermoelectric motor 70. Thus, when the ball 60 is closed on the seat 57 the oil discharged from the pump 34 enters the cylinder 15 and urges the piston to the left. When the leakage through the valve seat 57 is equal to the return of oil from the cylinder 15, the piston 16 will remain stationary. When the ball 60 is released from the seat 57, the oil pressure in the discharge passage 42 will tend to drop below the oil pressure in the cylinder 15 and the spring 25 will tend to move the piston to the right in the cylinder.

Figure 3:
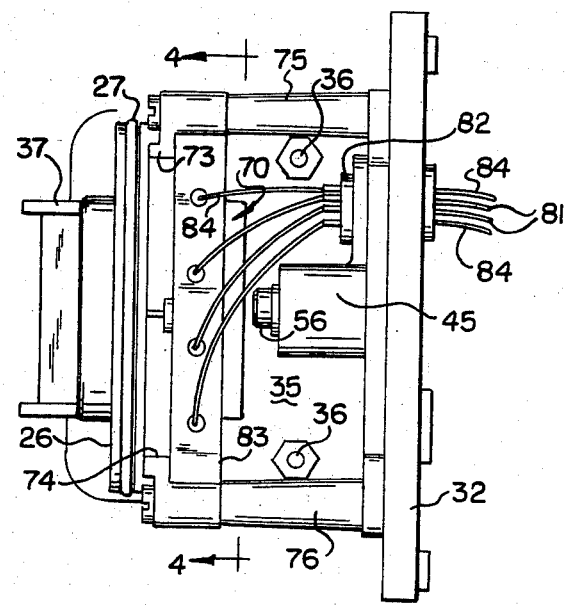
FIG. 3 is a side elevational view of the pump and end plate assembly for the actuator.
Figure 4:
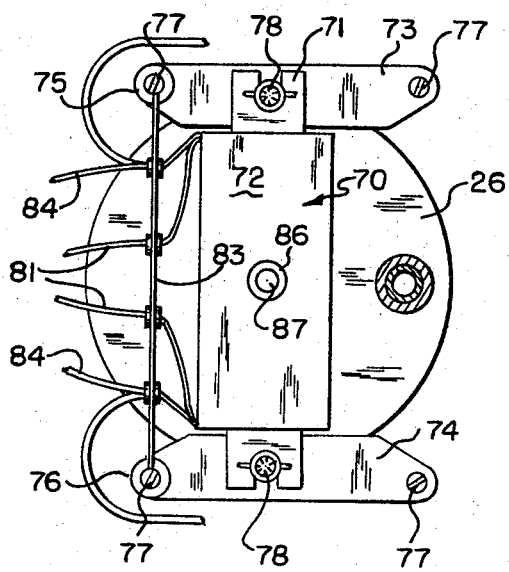
FIG. 4 is a sectional view taken substantially along line 4—4 of FIG. 3.

The motor 70 comprises a bimetal strip 71 enclosed in a suitable insulating jacket 72. The ends of the bimetal 71 are anchored to abutments 73,74 formed on the end wall 26 as seen in FIGS. 3 and 4. The abutments 73,74 provide means to attach the end wall 26 to the wall 35 and posts 75,76 formed on the end plate 32. This attachment is effected by four screws 77. The opposite ends of the bimetal 71 are attached to the abutments 73,74 by a pair of pins and lock washers 78, as seen in FIG. 4. When the bimetal 71 is heated it bows to the right, as viewed in FIG. 2 and engages the ball 60 and urges the ball against the seat 57. When relatively cool, the bimetal straightens and releases the ball 60 from the valve seat 57. The amount of oil flowing from the diverter valve depends upon the force exerted by the bimetal 71 against the ball 60.

The bimetal 71 is heated by an electric resistance heater 80 which is encased in the insulation 72. The resistance 80 is adapted to be energized by a suitable control circuit in response to a condition which requires movement of the actuator 12 to affect the condition. The complete control circuit for the heater 80 is not shown as such circuits are well known in the art and do not lend to the understanding of the present invention. Suffice to say, the resistance 80 is connected with the control circuit through wires 81 which enter the cavity 31 through a sealed plug 82 through the end plate 32. The wires 81 are supported in openings through an insulator panel 83 supported by the posts 75 and 76. The motor 37 is energized by wires 84 which likewise enter the cavity 31 through the plug 83 and are supported in openings through the panel 83.

The force exerted by the bimetal 71 tending to close the ball 60 on the seat 57 is also affected by the position of the piston 16 in the cylinder 15. This is accomplished by the provision of a sleeve 86 formed through the central portions of the insulating member 72 and the bimetal strip 71 opposite the ball 60. A plug 87 is carried in the sleeve 86 and is adapted to engage the retainer spring 62 opposite the ball 60. The plug 87 has a wire link 90 attached thereto which extends through an opening 91 in the end wall 25 of the cylinder. The diameter of link 90 is but slightly less than that of the opening 91. The link 90 is attached to one end of a tension spring 92 and the other end of the spring is secured to the piston 16. As the piston 16 moves from the wall 26 the tension of spring 92 increases in its tendency to move the bimetal 71 away from the diverter ball 60 causing the ball to open the seat 57 when the piston reaches a given position, depending upon the temperature of the bimetal 71. Accordingly, a greater degree of heating of the element 80 will be required to cause the bimetal 71 to close the ball 60 on its seat 57 as the piston 16 moves towards the full line position shown in FIG. 1. Thus, different signals in the condition responsive circuit which energizes the heater will cause the piston 16 to be moved to different predetermined positions in the cylinder. This permits a determination of the damper positions to meet the requirements of the conditions sensed by the control circuit for the bimetal 71. Furthermore, should the piston 16 tend to move to the right because of slight leakage of oil around the link 90 into the cavity 31, the relaxing of the tension of spring 92 non the bimetal 71 will force the ball 60 to the valve seat 57 and oil will be directed into the cylinder through the bore 47 to act on the piston.

We claim:

1. A condition responsive actuator comprising wall means forming a cylinder and a cavity adjacent said cylinder, a piston in said cylinder, a fluid pump having a first discharge outlet heading into said cylinder for causing fluid to urge said piston in one direction in said cylinder, the intake of said pump communicating with said cavity, means forming a diverting discharge outlet port for said pump adapted to discharge into said cavity and divert fluid from said first discharge outlet into said cavity, a valve member adapted to close on said diverting discharge outlet, means in said cavity movable in response to a condition to move said valve member into said diverting discharge outlet port and throttle the flow of fluid through said port, and means including a screw member threaded in an opening in said wall means to adjustably position said diverting valve outlet port relative to said means moving said valve member by rotation of said screw member.

2. An actuator as defined in claim 1 further characterized by means to continually urge said piston in a direction opposite said one direction.

3. An actuator as defined in claim 1 further characterized by said diverting valve port comprising a cylindrical member thread into an opening through said wall means, and said outlet port formed on one end of said cylindrical member.

* * * * *